United States Patent [19]

Sargent

[11] Patent Number: 5,673,844
[45] Date of Patent: Oct. 7, 1997

[54] GAS PRESSURE ADJUSTABLE DIEBONDING APPARATUS AND METHOD

[75] Inventor: Richard H. Sargent, Taunton, Mass.

[73] Assignee: GTE Laboratories Incorporated, Waltham, Mass.

[21] Appl. No.: 581,270

[22] Filed: Dec. 29, 1995

[51] Int. Cl.[6] .................................................. H01L 21/58
[52] U.S. Cl. ............................................ 228/102; 228/6.2
[58] Field of Search ............................... 228/180.22, 6.2, 228/180.21, 102

[56] References Cited

U.S. PATENT DOCUMENTS

| | | | |
|---|---|---|---|
| Re. 33,641 | 7/1991 | Ackerman | 228/6.2 X |
| 4,307,832 | 12/1981 | Taki et al. | 228/6.2 X |
| 5,240,165 | 8/1993 | Geyer et al. | 228/6.2 X |
| 5,351,872 | 10/1994 | Kobayashi | 228/102 X |

*Primary Examiner*—Kenneth J. Ramsey
*Attorney, Agent, or Firm*—Leonard C. Suchyta

[57] ABSTRACT

A device placement or diebonding head for a diebonding apparatus including a chamber with openings in its end walls, a rod-and-piston combination extending through the chamber with the rod ends protruding through the openings, a gas inlet port into the chamber above or below the piston, and gas pressure resisting means to resist movement of said piston in response to gas pressure. The diebonding head rod has an axial bore therethrough. Its upper end is configured for connection to a vacuum source and its placement end is configured for mounting of a vacuum tool. Thus, force exerted by the rod placement end on a device being diebonded is adjustable by adjusting the gas pressure relative to the resisting means force. The gas inlet may be above or below the piston. The resisting means may be a helical spring in the same or the opposite end of the chamber as the gas inlet. Alternatively, the resisting means may be pressure from gas entering the opposite end of the chamber from the first gas inlet port. A gas inlet into the lower chamber end wall opening may be used to provide an air bearing to prevent binding of the rod within the opening. A diebonding apparatus and a method for adjusting the force exerted by a device placement head on a device being placed on a substrate are also disclosed.

18 Claims, 6 Drawing Sheets

5,673,844

GAS PRESSURE ADJUSTABLE DIEBONDING APPARATUS AND METHOD

BACKGROUND OF THE INVENTION

The present invention relates to the diebonding of a semiconductor device to a substrate surface, e.g., a metallized silicon or gallium arsenide single crystal wafer, for operation of the device. The invention particularly relates to apparatus and method for placement of a fragile semiconductor device on a substrate surface for diebonding to the substrate surface.

Diebonding is a process involving the soldering or cementing (e.g., adhesive bonding) of a semiconductor device, e.g., a laser, laser array, or photodetector diode onto a substrate surface, e.g., a circuit board for, e.g., the testing of the device or for incorporation of the device into a more complex circuit. Diebonding may be used as a means to provide a heat sink and/or an electrical ground for a device during its operation.

Prior art apparatus for performing the diebonding procedure has usually relied on a placement system built around a mechanical arm counterbalanced with adjustable, e.g., sliding weights. The weights must be physically moved along a bar at one end, the distal end, of the arm to adjust the gram force pressure applied by the semiconductor device placement system (e.g., its effective weight) at the opposite end, the proximal end, of the arm. The placement system typically includes a vacuum controlled pick-up tool for picking and placement of the semiconductor die or device. Typically, a human operator controls movement of the diebonding arm by means of a "Z" arm on the apparatus.

Operation of the apparatus involves picking up the semiconductor device from a tray or tape using the vacuum tool, placing the device in position on a circuit board or other operational surface, and holding the device in position until the bonding operation is complete. Excessive pressure exerted on the device by the placement system during the placement and bonding operation can cause failure of the device due to fracture of the device or interruption of the circuit incorporated therein. Such pressure can result from, e.g., thermal expansion of the diebonding stage which supports the substrate during the diebonding operation. This problem is particularly acute when the diebonding procedure involves high heat, for example, during a soldering operation. The counterweight system described above does not allow for the fine adjustment in response to expansion of the diebonding stage during the diebonding operation which is typically required during such soldering.

One prior art system has been designed for diebonding of a laser array diode to a silicon waferboard substrate. A diebonding head picks up and holds the laser array by means of a vacuum tool, the gram force pressure to be exerted by the diebonding head is fixed before bonding. No adjustment of the pressure on the device during the bonding operation is possible. The diebonding head pressure on the array increases during the heated bonding operation. Thus, thermal expansion of, e.g., the substrate holding stage during a soldering or other heat-requiring bonding operation presses the laser array against the unyielding diebonding head, fracturing the device.

Operators have attempted to address this problem by removing the diebonding head from the laser array immediately after placement of the device and before the bonding procedure begins. A second, separate counterweighted arm with minute pressure points is used to hold the laser array in position after the placement head is removed. This adaptation, however, is far from ideal. The exchange of tools is time consuming and the laser array often is found to have moved during the tool switching step. Even careful attention to this placement and bonding process yields only about one mounted device per hour.

Accordingly, it is an object of the present invention to provide a placement or diebonding head, apparatus, and method which overcome the disadvantages of the prior art.

It is another object of the invention to provide a placement or diebonding head which provides instant response to a measurement of the gram force pressure being applied to a device being placed and/or diebonded, adjusting this force or pressure before damage to the device can occur.

It is yet another object of the invention to provide a diebonding head which adjusts the gram force pressure on a device by providing a floating placement rod for which this gram force pressure may be adjusted independently of the effective weight of the remainder of the placement system.

It is still another object of the invention to provide a diebonding head which adjusts the gram force pressure on a device by providing a floating placement rod including a piston, the piston being enclosed within a chamber, e.g., a cylinder, gas pressure in the chamber portion above or below the piston adjusting the gram force pressure applied by the diebonding head to the semiconductor device, and resistance to this gas pressure providing increased control of the gram force pressure on the device.

SUMMARY OF THE INVENTION

In accordance with these objects, a device placement head and method, and a diebonding head, apparatus and method are disclosed in which the force exerted on a device being placed or placed and bonded may be adjusted by adjusting the relative pressures or forces within a cylinder, the pressures urging the placement rod of the head toward and away from the device.

In one aspect, the invention is a device placement head including one or more side walls and first and second end walls, the walls defining a chamber of substantially constant cross section, the second end wall including an opening therethrough, a rod-and-piston combination extending through the opening, a fluid inlet port into the chamber, and fluid pressure resisting means to resist movement of the piston. The piston is configured to fit closely within the chamber and to be reciprocally moveable therein in a direction parallel to the axis of the rod. A device placement end of the rod protrudes from the opening, the rod end being configured to fit closely within the opening and to be reciprocally moveable therein in a direction parallel to the rod axis. The piston and the rod in combination occupy sufficient cross-sectional area of the chamber to cause the piston to move away from the port in response to pressure of fluid entering the chamber through the port. The fluid pressure resisting means resists movement of the piston away from the port and causes the piston to move toward the port when the fluid pressure is less than force exerted by the resisting means. Thus, force exerted by the placement end of the rod on a device being placed is adjustable by adjusting the fluid pressure relative to the resisting means force.

In another aspect, the invention is a diebonding head for a diebonding apparatus, the diebonding head including one or more side walls and first and second end walls defining a chamber of substantially constant cross section, the first and second end walls including first and second openings, respectively, therethrough. The head further includes a rod-and-piston combination extending through the chamber, the piston dividing the chamber into first and second chamber portions near the first and second end walls, respectively, a gas inlet port into one of said first and said second chamber portions, and gas pressure resisting means to resist movement of the piston. The piston is configured to fit closely within the chamber and to be reciprocally moveable therein in a direction parallel to the axis of the rod. A first end of the rod protrudes from the first opening and a device placement end of the rod protrudes from the second opening, the rod ends being configured to fit closely within the openings and to be reciprocally moveable therein in a direction parallel to the rod axis. The rod has an axial bore therethrough. The first end of the rod is configured for connection to a vacuum source and its placement end is configured for mounting of a vacuum tool. The piston and the rod in combination occupy sufficient cross-sectional area of the chamber to cause the piston to move away from the port in response to pressure of gas entering the one chamber portion through the port. The gas pressure resisting means resists movement of the piston away from the port and causes the piston to move toward the port when the gas pressure is less than force exerted by the resisting means. Thus, force exerted by said placement end on a device being diebonded is adjustable by adjusting the gas pressure relative to the resisting means force.

In a narrower embodiment, the close fit of the piston within the chamber permits some gas flow past the piston. In another narrower embodiment, the close fit of the rod ends within the openings permits some gas flow from the chamber through the openings. In other narrower embodiments, the gas pressure resisting means is a biasing means disposed within the cylinder to resist axial movement of the piston away from the port and to cause the piston to move axially toward the port when the gas pressure is less than biasing force exerted by the biasing means. The biasing means may be a helical spring opposing the gas pressure by means of its resistance to compression or elongation. In yet another alternate embodiment, the gas inlet port is a first gas inlet port one of the chamber portions, and the gas pressure resisting means includes an additional gas inlet port into the other of the chamber portions, pressure of gas entering the chamber through the additional inlet port providing the resisting means force.

In yet another aspect, the invention is a diebonding apparatus including the diebonding head described above, a horizontal diebonding stage for support of a substrate on which a device is to be diebonded, a post, and an arm supporting the diebonding head and mounted on the post to be vertically and rotatably moveable relative thereto. Force exerted by the diebonding head on the device during a diebonding procedure is adjustable by adjusting the gas pressure relative to the resisting means force.

In a narrower embodiment, the apparatus further includes pressure sensing means to measure the diebonding head force, and feedback control means responsive to the force measurement to control the diebonding head force by control of the gas pressure.

In still another aspect, the invention is a method for adjusting a force exerted by a device placement head on a device being placed on a substrate. The method involves providing the device placement head described above, placing the device on the substrate with the placement end, and adjusting force exerted by the placement head on the device during the placement by adjusting the gas pressure relative to force exerted by the resisting means.

In a further aspect, the invention is a method for adjusting a force exerted by a diebonding head on a device being diebonded to a substrate. The method involves providing the diebonding head described above, connecting a first end of the rod to a vacuum source, mounting a vacuum tool on a device placement end of the rod, placing and holding the device on the substrate using the vacuum tool, diebonding the device to the substrate by soldering or adhesive bonding, and adjusting force exerted on the device during the diebonding by the placement end and tool by adjusting the gas pressure relative to force exerted by the resisting means.

BRIEF DESCRIPTION OF THE DRAWINGS

For a better understanding of the present invention, together with other objects, features, advantages, and capabilities thereof, reference is made to the following Description and appended Claims, together with the Drawing in which:

DETAILED DESCRIPTION OF THE PREFERRED EMBODIMENTS

Figure 1:
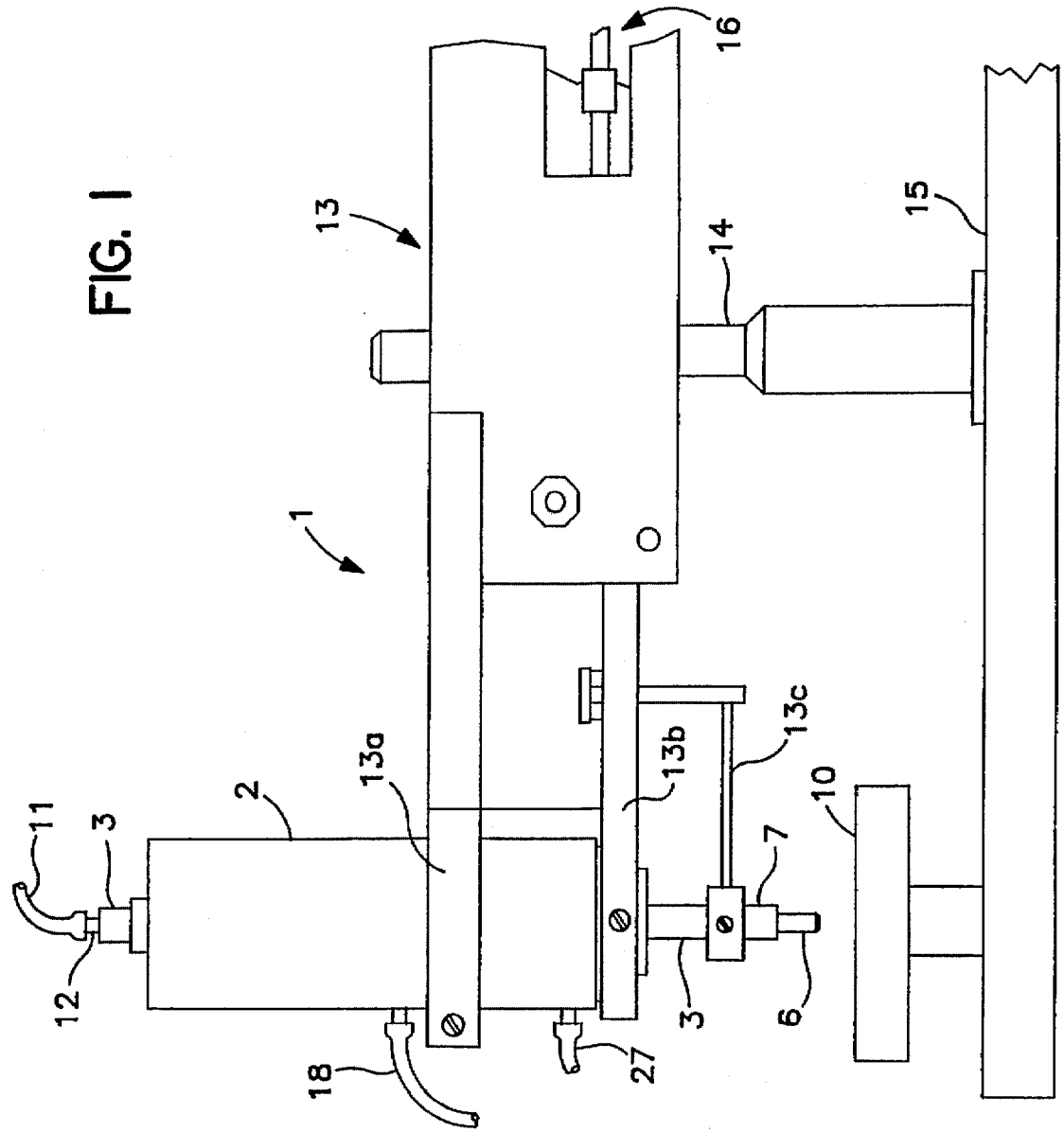
FIG. 1 is an elevation view of a device placement system in accordance with one embodiment of the present invention.

The device placement and diebonding systems described herein each include a cylinder enclosing a piston and a floating placement rod or shaft, the movement of which is controlled by the movement of the piston. The systems permit adjustment, during the placement or diebonding operation, of the gram force pressure exerted on a semiconductor device being placed or diebonded onto a substrate. A pressure adjustment of 0 grams to in excess of 50 grams is possible with the systems described herein. The pressure adjustment is effected by pumping a gas, e.g., an inert gas into the portion of the cylinder on one side of the piston to apply pressure to the piston. Fine control of the movement of the piston/rod combination is effected by providing resistance to movement of the piston, as described in further detail below. The placement rod remains in contact with the device during the placement and diebonding operation, compensating for thermal expansion of a diebonding stage by pressure adjustment and movement of the floating placement rod. Tool damage to the semiconductor device and placement error from tool switching are eliminated, and output of mounted semiconductor devices is increased.

In a preferred exemplary embodiment, a diebonding apparatus or other device placement apparatus includes a device placement head including a cylindrical chamber of substantially constant cross section, an end wall of the chamber including an opening through which a floating device placement rod extends from the inside to the outside of the chamber. A piston fixed to the internal portion of the rod is close fitted to the internal cross-section of the chamber for reciprocal sliding movement within the chamber in a direction parallel to the rod axis. The rod fits closely within the opening and protrudes therefrom for reciprocal movement with the piston. The rod device placement end is adapted to perform a pick and place operation on a semiconductor device, e.g., by attachment of a vacuum tool.

The chamber portion below the piston is flooded with sufficient inert gas entering the chamber through an inlet port to apply upward pressure to the piston. A coil spring or other biasing means in the chamber portion above the piston resists upward movement of the piston because of its compression resistance. Thus, fine adjustment of the movement of the piston and the downward directed gram force pressure exerted by the rod placement end on a device may be made during placement or diebonding by adjusting the gas pressure relative to the spring biasing force. If desired, coarse adjustment may be made before placement and diebonding of the device by adjustment of counterweights on an arm of the apparatus supporting the head, as described above.

Alternatively, the stability of the placement end of the rod may be increased by extending the rod upward from the piston to protrude through and fit closely within an opening in the upper end wall of the chamber. Preferably, an axial bore through the rod communicates with a vacuum source at the rod upper end to provide vacuum to the lower, placement end of the rod, which may be fitted with a vacuum tool. Such vacuum tools are known in the art. Alternatively, a vacuum tool may be connected directly to a vacuum source.

In alternate embodiments, the diebonding apparatus has a diebonding head including a chamber similar to that described above. Also as described above, an inert gas is pumped into the chamber, the gas pressure being resisted by a helical spring or other biasing means disposed in the chamber. However, in one alternate embodiment, both the spring and the gas are in the upper part of the cylinder above the piston. The spring is fixed at its upper and lower ends to the upper end wall and the piston, respectively. Gas pressure is used to lower the piston and rod assembly before device placement, against the resistance to elongation of the spring. Reduction in the gas pressure permits the spring to pull the piston upward, relieving pressure on the device. In other alternate embodiments, the spring is disposed below the piston. In one embodiment the gas is pumped into the chamber below the piston, and the ends of the spring are fixed to the piston and the chamber. In this embodiment, the gas pressure resistance is provided by the elongation resistance of the spring. Increasing the gas pressure raises the piston and rod assembly against the elongation resistance of the spring, relieving pressure on the device. In another embodiment, the gas is pumped into the chamber above the piston, the gas pressure resisting force being provided by the compression resistance of the spring below the piston. In this embodiment, the gas pressure is increased before placement, lowering the rod and piston assembly against the compression resistance of the spring. Reduction in the gas pressure permits the spring to push the piston upward, relieving pressure on the device.

In yet another alternate embodiment, the gas pressure described above, either above or below the piston, is resisted by pressure of gas, e.g., an inert gas entering the opposite end of the chamber through an additional inlet port. This second gas pressure is supplied independently of the first gas supply. Adjustment of the separate gas pressures relative to one another during placement and diebonding provides the desired fine adjustment of the downward directed gram force pressure exerted by the rod placement end on the semiconductor device.

As described above, in any of these embodiments, coarse adjustment may be made before placement and diebonding of the device by adjustment of counterweights on an arm of the apparatus supporting the head.

In a particularly desirable embodiment, the inert gas is also pumped into the end wall opening in the gas pressurized chamber portion to provide an air bearing to prevent binding of the rod within that opening.

In any of the above embodiments, the diebonding apparatus, in addition to the diebonding head, may include a horizontal stage for support of a substrate on which a device is to be diebonded, a post, and an arm supporting the diebonding head and mounted on the post to be vertically and rotatably moveable relative thereto. Typically, the stage is mounted on the post below the arm or on a base to which the post is also mounted. Also typically, one end of the support arm extends outward from the post opposite to the diebonding head and includes counterweights slidable on that end, e.g., along a bar for gross adjustment of force to be exerted by the diebonding head on the device, fine adjustment of the force being effected by adjustment of the gas pressure as described above. A pressure sensor may be used, e.g., on the vacuum tool, on the diebonding stage, or in the gas line(s) to measure or monitor the force of the diebonding head on the device, and feedback control means responsive to the force measurement may be used to control the diebonding head force by control of the gas pressure.

In a typical operation, the counterweights are adjusted to approximate the desired downward gram force pressure on the device, the upper end of the rod is connected to a vacuum source, and a vacuum tool is mounted on the lower, device placement end of the rod. The device is picked up, e.g., from a tray or a tape using the vacuum tool, and is placed on the substrate. The device may then be then soldered or adhesively bonded to the substrate by the operator while the device is held in place on the substrate by the placement head and vacuum tool. The force exerted by the placement head on the device during placement and or bonding is adjusted by adjusting the gas pressure relative to force exerted by the spring or opposing gas pressure.

The description below of various illustrative embodiments shown in the Drawings refers to certain embodiments of the invention. However, the description is not intended to limit the scope of the present invention, but merely to be illustrative and representative thereof.

Figure 2:
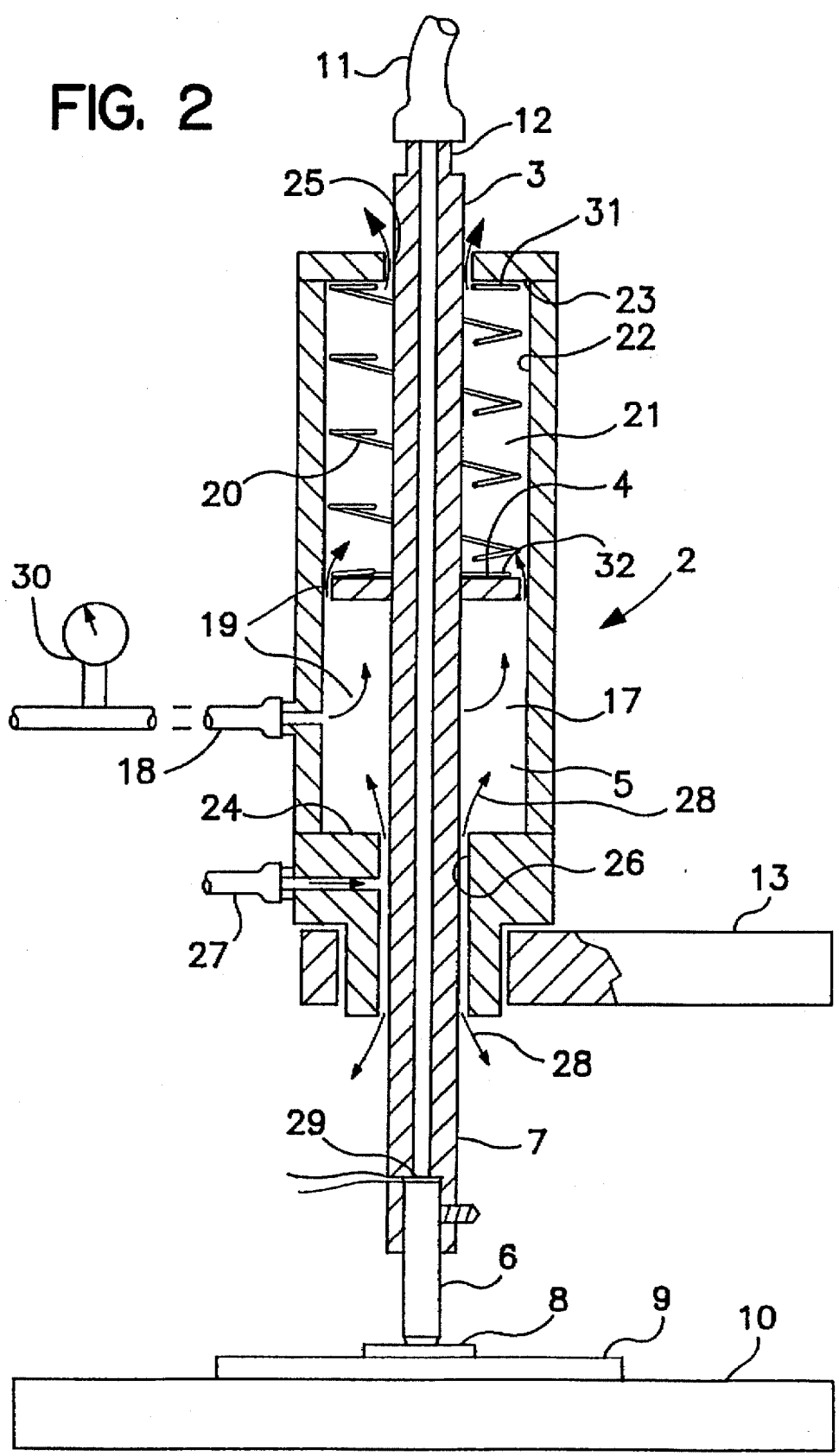
FIG. 2 is a schematic elevation view, partly in cross-section, of the system of FIG. 1.

Referring now to FIGS. 1 and 2, diebonding apparatus 1 in accordance with one embodiment of the present invention includes diebonding head 2 including device placement rod or shaft 3 and piston 4 enclosed in chamber 5 within diebonding head 2. Vacuum tool 6 is fitted to the lower end, the device placement end 7, of rod 3 for pick up and placement of a semiconductor device, as laser array diode 8, onto a substrate, as metallized silicon waferboard 9 on diebonding stage 10. Vacuum line 11 is fitted to upper end 12 of rod 3 to provide vacuum to vacuum tool 6 from a vacuum source (not shown).

Support arm 13 supports diebonding head 2 on shaft 14 which is mounted on base 15 of apparatus 1. For stability, head 2 is supported by three support bands, 13a, 13b, and 13c of arm 13. Counterweight system 16 is provided on arm 13 for gross adjustment of the gram force pressure to be exerted on device 8 by rod 3 and tool 7 during the placement and diebonding operation. Stage 10 is also mounted on base 15.

Piston 4, rod 7, and vacuum tool 6 slide reciprocally within chamber 5 in a direction parallel to the axis of rod 3 in response to pressure exerted on piston 4 by gas entering lower portion 17 of chamber 5 from gas line 18 connected to a source of pressurized gas (not shown). The gas pressure in chamber portion 17 is controlled by conventional means. The flow direction of the gas entering chamber portion 17 is shown by arrows, as 19. Movement of piston 4 is resisted by helically coiled spring 20 or other biasing means in upper portion 21 of chamber 5.

Preferably, chamber 5 is cylindrical, thus having a substantially constant cross-section, and is defined by side wall 22 and upper and lower end walls 23 and 24. Rod upper end 12 protrudes from opening 25 in end wall 23, while rod placement end 7 protrudes from opening 26 in end wall 24. Optionally, an air bearing is provided for rod 3 by gas entering opening 26 from gas line 27, which typically is connected to the same source of pressurized gas as gas line 18. The flow direction of the gas entering opening 26 is shown by arrows, as 28.

In operation, a human operator moves arm 13 and diebonding head 2 using a Z-arm, as is known in the art, to pick up device 8 from a tray or a tape using vacuum tool 6, and places device 8 on substrate 9, which rests on stage 10. As the operator proceeds with the diebonding operation, e.g., by soldering device 8 onto substrate 9 using soldering apparatus (not shown), heat from the diebonding operation causes expansion of stage 10, moving substrate 9 and device 8 upward and creating increased pressure on device 8 from rod 3 and tool 6, as measured, e.g., by pressure sensing device 29 between tool 6 and rod placement end 7. The operator increases gas pressure, as measured at gauge 30, to move the piston 4, floating rod 3, and vacuum tool 6 slightly upward until sensor 29 registers a pressure which will not damage device 8. Tool 6, however, remains in contact with device 8, holding it in place on substrate 9 for the remainder of the diebonding operation. This pressure adjustment procedure may be repeated as often as necessary during the diebonding procedure to avoid damaging device 8. In this embodiment, upper and lower ends 31 and 32 of spring 20 need not be fixed to upper end wall 23 and piston 4, respectively, of chamber 5.

Figure 3:
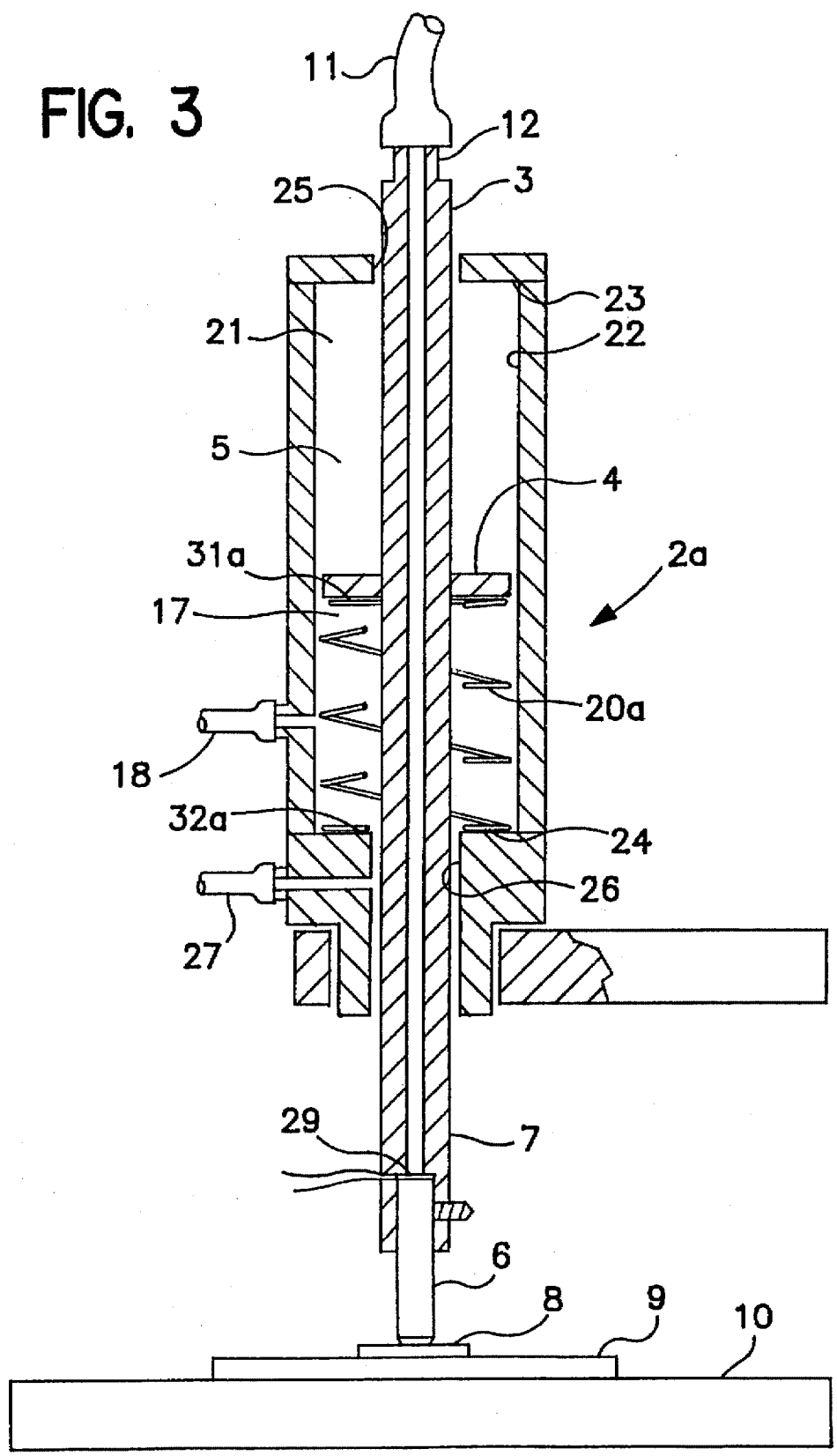
FIG. 3 is a schematic elevation view of a diebonding system, partly in section, in accordance with another embodiment of the present invention.

FIG. 3 illustrates a diebonding head similar to that shown in FIGS. 1 and 2, like features being identified by the same reference numerals. Diebonding head 2a includes chamber 5 similar to that described above. Also as described above, an inert gas is pumped into the chamber, the gas pressure being resisted by a spring disposed in the chamber. However, in the embodiment illustrated in FIG. 3, both spring 20a and the gas are in lower portion 17 of chamber 5 below piston 4. Spring 20a is fixed at its upper and lower ends, 31a and 32a respectively, to lower end wall 24 and piston 4, respectively. Spring ends 31a and 32a may be fixed, e.g., adhesively or by soldering. In this embodiment, the gas pressure resistance is provided by the elongation resistance of spring 20a. Increasing the gas pressure raises piston 4 and rod 3 against the elongation resistance of spring 20a, relieving pressure on device 8.

Figure 4:
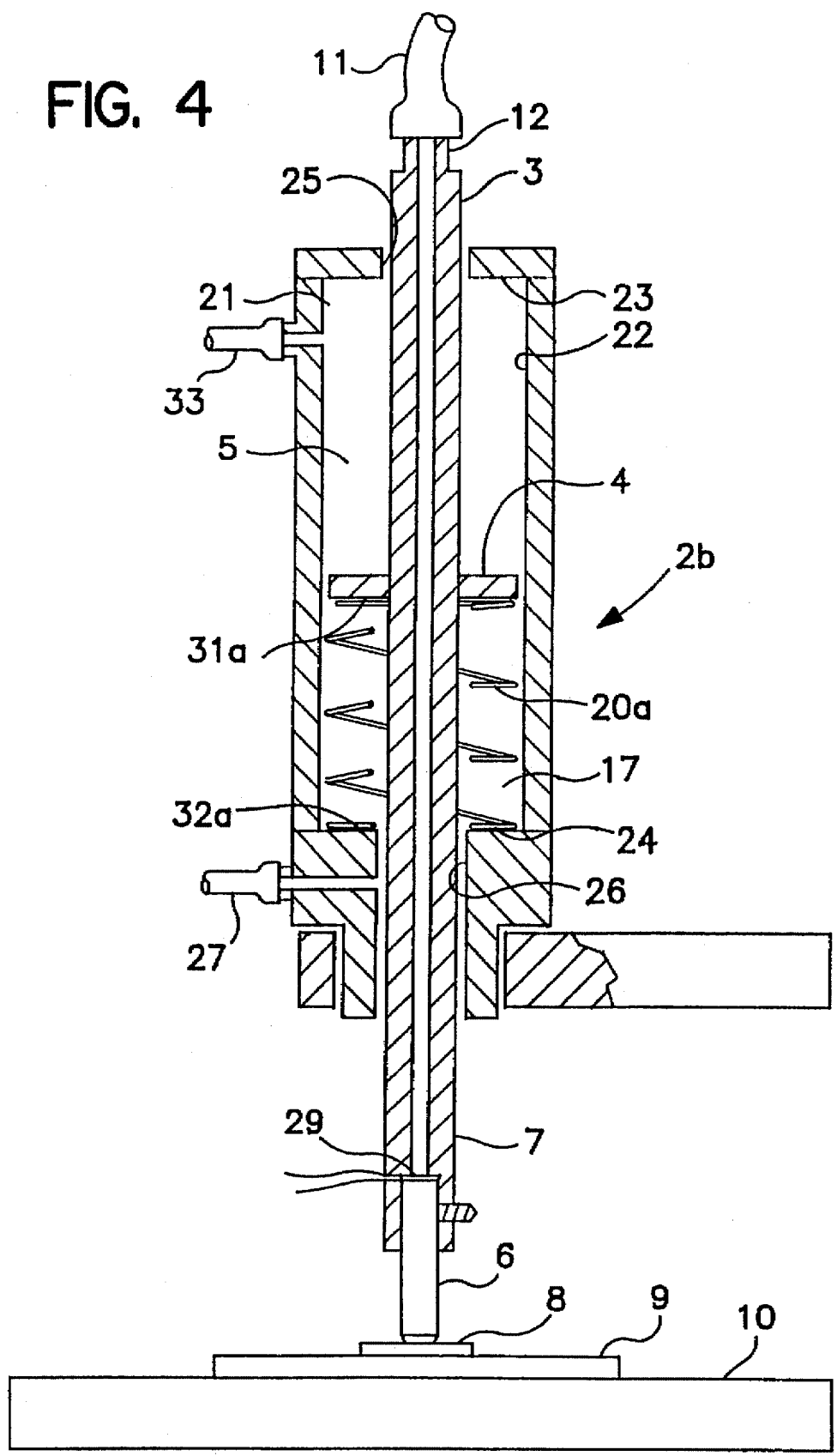
FIG. 4 is a schematic elevation view of a diebonding system, partly in section, in accordance with yet another embodiment of the present invention.

In another embodiment illustrated in FIG. 4, the spring is also disposed below the piston. In FIG. 4, like features are again indicated by the same reference numerals as in FIGS. 1-3. The gas is pumped into upper portion 21 of chamber 5 above piston 4, the gas pressure resisting force being provided by the compression resistance of spring 20a below the piston. Ends 31a and 32a of spring 20a need not be fixed. In this embodiment, the gas pressure is increased before placement, lowering rod 3 and piston 4 against the compression resistance of spring 20a. Reduction in the gas pressure permits spring 20a to push piston 4 upward, relieving pressure on device 8.

Figure 5:
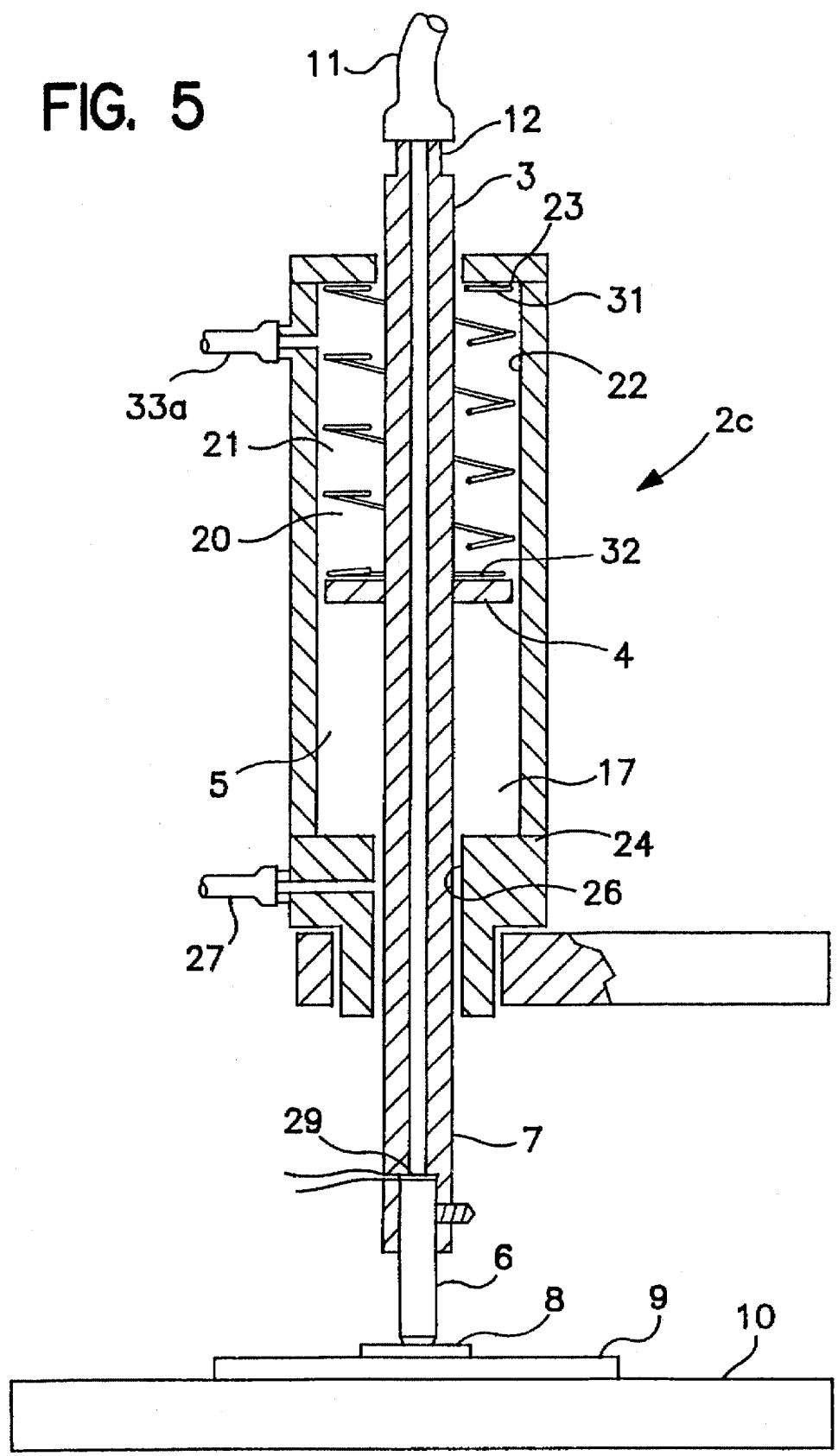
FIG. 5 is a schematic elevation view of a diebonding system, partly in section, in accordance with still another embodiment of the present invention.

In yet another alternate embodiment illustrated in FIG. 5, gas pressure below the piston is resisted by elongation resistance of the spring. Ends 31 and 32 of spring 20 are fixed to end wall 23 and piston 4, respectively Increasing the gas pressure lowers piston 4 and rod 3, before placement, against the elongation resistance of spring 20. Reduction in the gas pressure permits spring 20 to pull piston 4 upward, relieving pressure on device 8.

In the above-described embodiments, the gas pressure resisting means is described as a helical spring. Alternatively, another known type of spring or biasing means may be used, e.g., a flat, leaf, elliptic, volute, or arc spring. Any of these biasing means may be fabricated from a metal of polymeric material, as is known in the art.

Figure 6:
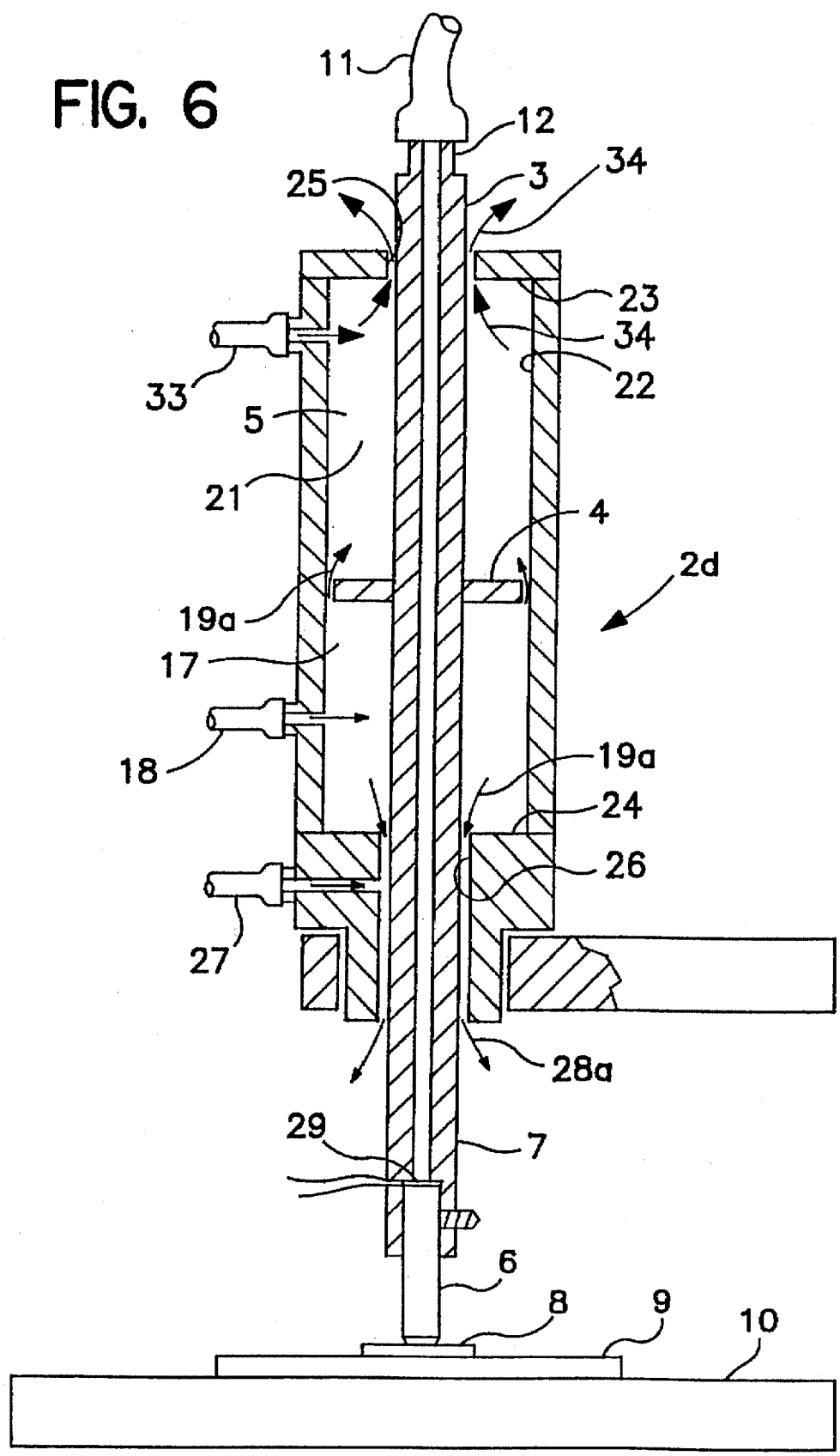
FIG. 6 is a schematic elevation view of a diebonding system, partly in section, in accordance with a further embodiment of the present invention.

In still another alternate embodiment illustrated in FIG. 6, gas pressure below the piston is resisted by gas pressure above the chamber. Again, like features to those shown in FIGS. 1-4 are indicated by the same reference numerals. Before placement of device 8, pressure in upper and lower chamber portions 21 and 17, respectively, is balanced by pumping of gas into the upper and lower chamber portions through gas lines 33 and 18, respectively. This balance typically is maintained throughout the picking and placement operation. In response to increasing pressure on device 8 during the diebonding operation, piston 4, rod 7, and vacuum tool 6 slide upward, as described above, by an increase in the pressure of gas in lower chamber portion 17. Movement of piston 4 is resisted by increasing pressure in the gas in upper chamber portion 21 caused by the compression of gas in upper chamber portion 21 by the movement of piston 4. Typically, during operation, gas escapes from the higher pressure chamber portion to the other portion and from both chamber portions through openings 25 and 26, as shown by arrows 19a, 28a, and 34. Thus, gas must be pumped periodically or continuously into chamber portions 21 and 17 in order to maintain a selected gas pressure in the chamber portions.

In operation, a human operator moves the arm (not shown) and diebonding head 2d, as described above with reference to FIGS. 1 and 2, to pick up and place device 8, using vacuum tool 6, on substrate 9. As heat from the diebonding operation causes expansion of stage 10, moving substrate 9 and device 8 upward and creating increased pressure on device 8 from rod 3 and tool 6, as described above, the operator increases gas pressure in chamber portion 17 to move the piston 4, floating rod 3, and vacuum tool 6 slightly upward against gas pressure in chamber portion 21, until sensor 29 registers a pressure which will not damage device 8. Tool 6, however, remains in contact with device 8, holding it in place on substrate 9 for the remainder of the diebonding operation. This pressure adjustment procedure may be repeated as often as necessary during the diebonding procedure to avoid damaging device 8. The gas pressure in chamber portion 21 is supplied independently of that in chamber portion 17. Adjustment of the separate gas pressures relative to one another during placement and diebonding provides the desired fine adjustment of the downward directed gram force pressure exerted by the rod placement end on the semiconductor device.

In any of the above-described embodiments, the described arm may be replaced by any known support means, e.g., an overhead support system that permits three-dimensional adjustment of the position of the head. The diebonding stage may be unitary with the base, or may be height-adjustable above the base. Although gas pressure is greatly preferred, other fluid pressure may be substituted, e.g., a pressurizable liquid. The chamber walls may be fabricated from a metal, a rigid polymer, etc, and may be assembled with O-rings to seal the joints. The pressure sensor is preferred, but optional, and may be positioned between the vacuum tool and the rod, as shown, or may be, e.g., part of the diebonding stage or inserted between the substrate and the stage, or increased pressure on the device may be determined, e.g., by monitoring minute changes in gas pressure. Although a diebonding apparatus is described above having a vacuum operated pick-and-place diebonding head, the same principals apply to any placement head requiring fine adjustment during a picking, placement, or bonding operation. Thus, other known pick-and-place means, e.g., mechanical means, may be substituted for the described vacuum line, bored rod, and/or vacuum tool. However, the described vacuum system is much preferred because of its simplicity.

The invention described herein presents to the art a novel, improved diebonding apparatus having a pressure adjustable diebonding head including a floating rod and piston assembly which greatly increases productivity and minimizes rejected material in the placement and bonding of fragile semiconductor devices. The new system permits the pressure exerted by the diebonding head on a placed semiconductor device to be adjusted quickly and continuously, with no need to enter the apparatus for time consuming internal weight adjustments. Thus, the head can be left in contact with the device during the bonding process. No changing of tools is necessary, and displacement of the semiconductor device is minimized. Further, the novel apparatus is adaptable to computer controlled movement of the diebonding head in response to the pressure exerted on the device.

While there has been shown and described what are at present considered the preferred embodiments of the invention, it will be apparent to those skilled in the art that modifications and changes can be made therein without departing from the scope of the present invention as defined by the appended Claims.

We claim:

1. A device placement head comprising:
   one or more side walls and first and second end walls, said walls defining a chamber of substantially constant cross section, said second end wall including an opening therethrough;
   a rod-and-piston combination extending through said opening, wherein said piston is configured to fit closely within said chamber and to be reciprocally moveable therein in a direction parallel to the axis of said rod, and a device placement end of said rod protrudes from said opening, said rod end being configured to fit closely within said opening and to be reciprocally moveable therein in a direction parallel to said rod axis;
   a fluid inlet port into said chamber, said piston and said rod in combination occupying sufficient cross-sectional area of said chamber to cause said piston to move away from said port in response to pressure of fluid entering said chamber through said port; and fluid pressure resisting means to resist movement of said piston away from said port and to cause said piston to move toward said port when said fluid pressure is less than force exerted by said resisting means;
   wherein force exerted by said placement end on a device being placed is adjustable by adjusting said fluid pressure relative to said resisting means force.

2. A diebonding head for a diebonding apparatus comprising:
   one or more side walls and first and second end walls defining a chamber of substantially constant cross section, said first and second end walls including first and second openings, respectively, therethrough;
   a rod-and-piston combination extending through said chamber; wherein said piston is configured to fit closely within said chamber and to be reciprocally moveable therein in a direction parallel to the axis of said rod; said piston divides said chamber into first and second chamber portions near said first and second end walls, respectively; a first end of said rod protrudes from said first opening and a device placement end of said rod protrudes from said second opening, said rod ends being configured to fit closely within said openings and to be reciprocally moveable therein in a direction parallel to said rod axis; said rod has an axial bore therethrough; said first end is configured for connection to a vacuum source; and said placement end is configured for mounting of a vacuum tool;
   a gas inlet port into one of said first and said second chamber portions, said piston and said rod in combination occupying sufficient cross-sectional area of said chamber to cause said piston to move away from said port in response to pressure of gas entering said one chamber portion through said port; and
   gas pressure resisting means to resist movement of said piston away from said port and to cause said piston to move toward said port when said gas pressure is less than force exerted by said resisting means;
   wherein force exerted by said placement end on a device being diebonded is adjustable by adjusting said gas pressure relative to said resisting means force.

3. A diebonding head in accordance with claim 2 wherein said chamber is cylindrical in shape.

4. A diebonding head in accordance with claim 2 wherein said close fit of said piston within said chamber permits some gas flow past said piston.

5. A diebonding head in accordance with claim 4 wherein said close fit of said rod ends within said openings permits some gas flow from said chamber through said openings.

6. A diebonding head in accordance with claim 5 wherein said gas inlet port is a first gas inlet port, and further comprising a second gas inlet port into said second opening to provide an air bearing to prevent binding of said rod within said second opening.

7. A diebonding head in accordance with claim 2 wherein said gas pressure resisting means is a biasing means disposed within said cylinder to resist axial movement of said piston away from said port and to cause said piston to move axially toward said port when said gas pressure is less than biasing force exerted by said biasing means.

8. A diebonding head in accordance with claim 7 wherein said gas inlet port is disposed to permit gas flow into said second chamber portion, and said biasing means is a helical spring disposed in said first chamber portion.

9. A diebonding head in accordance with claim 7 wherein said gas inlet port is disposed to permit gas flow into said second chamber portion, said biasing means is a helical spring disposed in said second chamber portion, respective ends of said spring being fixed to said piston and said second end wall.

10. A diebonding head in accordance with claim 2 wherein said gas inlet port is a first gas inlet port, and said gas pressure resisting means comprises an additional gas inlet port into the other of said first and said second chamber portions, pressure of gas entering said chamber through said additional inlet port providing said resisting means force.

11. A diebonding apparatus comprising:
    a diebonding head including:

one or more side walls and first and second end walls defining a chamber of substantially constant cross section, said first and second end walls including a first and second openings, respectively, therethrough;

a rod-and-piston combination extending through said chamber; wherein said piston is configured to fit closely within said chamber and to be reciprocally moveable therein in a direction parallel to the axis of said rod; said piston divides said chamber into first and second chamber portions near said first and second end walls, respectively; a first end of said rod protrudes from said first opening and a device placement end of said rod protrudes from said second opening, said rod ends being configured to fit closely within said openings and to be reciprocally moveable therein in a direction parallel to said rod axis; said rod has an axial bore therethrough; said first end is configured for connection to a vacuum source; and said placement end is configured for mounting of a vacuum tool;

at least one gas inlet port into said first or said second chamber portion, said piston and said rod in combination occupying sufficient cross-sectional area of said chamber to cause said piston to move away from said port in response to pressure of gas entering said chamber through said port; and gas pressure resisting means to resist movement of said piston away from said port and to cause said piston to move toward said port when said gas pressure is less than force exerted by said resisting means;

a horizontal diebonding stage for support of a substrate on which a device is to be diebonded;

a post; and an arm supporting said diebonding head and mounted on said post to be vertically and rotatably moveable relative thereto;

wherein force exerted by said diebonding head on said device during a diebonding procedure is adjustable by adjusting said gas pressure relative to said resisting means force.

12. A diebonding apparatus in accordance with claim 11 wherein one end of said support arm extends outward from said post in a direction opposite from said diebonding head and includes counterweight means slidable on said one end for gross adjustment of force to be exerted by said diebonding head on said device, fine adjustment of said diebonding head force being effected by adjustment of said gas pressure relative to said resisting means force.

13. A diebonding apparatus in accordance with claim 11 further including pressure sensing means to measure said diebonding head force, and feedback control means responsive to said force measurement to control said diebonding head force by control of said gas pressure.

14. A method for adjusting a force exerted by a device placement head on a device being placed on a substrate, said method comprising:

providing a device placement head comprising: a chamber of substantially constant cross section; a rod-and-piston combination extending through said chamber, said piston being configured to fit closely within said chamber and to be reciprocally moveable therein in a direction parallel to the axis of said rod, said piston dividing said chamber into first and second chamber portions, a placement end of said rod protruding from an opening in an end wall of said chamber and being configured to fit closely within said opening and to be reciprocally moveable therein in a direction parallel to said rod axis;

fluid inlet means for providing fluid pressure in one of said first and second chamber portions to effect axial movement of said piston in one direction within said chamber; and fluid pressure resisting means to resist said piston movement in said one axial direction;

placing said device on said substrate with said placement end; and adjusting force exerted by said placement head on said device during said placement by adjusting said gas pressure relative to force exerted by said resisting means.

15. A method for adjusting a force exerted by a diebonding head on a device being diebonded to a substrate, said method comprising:

providing a diebonding head comprising: a chamber of substantially constant cross section; a rod-and-piston combination extending through said chamber, said piston being configured to fit closely within said chamber and to be reciprocally moveable therein in a direction parallel to the axis of said rod, said piston dividing said chamber into first and second chamber portions, ends of said rod protruding from openings in end walls of said chamber and being configured to fit closely within said openings and to be reciprocally moveable therein in a direction parallel to said rod axis, and said rod having an axial bore therethrough; gas inlet means for providing gas pressure in one of said first and said second chamber portions to effect axial movement of said piston in one direction within said chamber; and gas pressure resisting means to resist said piston movement in said one axial direction;

connecting a first end of said rod to a vacuum source;

mounting a vacuum tool on a device placement end of said rod;

placing and holding said device on said substrate using said vacuum tool;

diebonding said device to said substrate by soldering or adhesive bonding; and adjusting force exerted on said device during said diebonding by said placement end and tool by adjusting said gas pressure relative to force exerted by said resisting means.

16. A method in accordance with claim 15 further comprising, before said diebonding, mounting said diebonding head on an arm including counterweight means; and adjusting said counterweight means to effect grossadjustment of force to be exerted on said device by said placement end and tool, fine adjustment of said force on said device being effected during said diebonding by adjustment of said gas pressure relative to said resisting means force.

17. A method in accordance with claim 15 wherein said gas pressure resisting means is a biasing means disposed within said cylinder to resist axial movement of said piston in one direction and to cause said piston to move axially in an opposite direction when said gas pressure is less than biasing force exerted by said biasing means, and wherein said force adjusting comprises adjusting said gas pressure relative to said biasing force.

18. A method in accordance with claim 15 wherein said gas inlet means is a first gas inlet port providing gas pressure in one of said first and second chamber portions, and said gas pressure resisting means is an additional gas inlet port providing gas flow into the other of said first and second chamber portions, said adjusting force being effected by adjusting relative gas pressures in said first and second chamber portions.

* * * * *